(12) United States Patent
Wacey (10) Patent No.: US 8,121,437 B2
(45) Date of Patent: Feb. 21, 2012

(54) METHOD AND APPARATUS OF SEARCHING FOR IMAGES

(75) Inventor: Adam Ian Wacey, London (GB)

(73) Assignee: Sony Corporation, Tokyo (JP)

(*) Notice: Subject to any disclaimer, the term of this patent is extended or adjusted under 35 U.S.C. 154(b) by 829 days.

(21) Appl. No.: 12/181,590

(22) Filed: Jul. 29, 2008

(65) Prior Publication Data

US 2009/0110272 A1    Apr. 30, 2009

(30) Foreign Application Priority Data

Oct. 31, 2007    (GB) .................................. 0721404.2

(51) Int. Cl.
*G06K 9/54* (2006.01)
*G06K 9/00* (2006.01)
*G09G 5/02* (2006.01)

(52) U.S. Cl. ..................... 382/305; 382/162; 345/589

(58) Field of Classification Search ............... 382/162, 382/165, 166, 168, 173, 218, 251, 266, 279, 382/305, 312, 190; 345/418, 603, 604, 589, 345/593, 597; 375/240.19, 341; 348/273
See application file for complete search history.

(56) References Cited

U.S. PATENT DOCUMENTS

| | | | |
|---|---|---|---|
| 6,477,269 B1 | 11/2002 | Brechner | |
| 6,608,942 B1 * | 8/2003 | Le | 382/279 |
| 6,728,406 B1 | 4/2004 | Murao | |
| 6,933,970 B2 * | 8/2005 | Koshiba et al. | 348/273 |
| 7,149,262 B1 * | 12/2006 | Nayar et al. | 375/341 |
| 7,587,092 B2 * | 9/2009 | Cai et al. | 382/239 |
| 7,676,403 B2 * | 3/2010 | Crutchfield et al. | 705/26.1 |

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

A method for searching images includes applying a color resolution reduction process to at least part of a first image such that a total number of colors in the first image is reduced, forming a plurality of color planes, each color plane containing only image elements of the same color from the first image, deriving feature data from each of the color planes corresponding to a property of the image elements, creating a feature data representation representing the feature data derived from each of the plurality of color planes, undertaking a comparison of the feature data representation derived from the at least part of the first image with feature data representations derived from a plurality of other images, and selecting one of the plurality of other images on the basis of the comparison.

16 Claims, 11 Drawing Sheets

| 0 | 0 | 0 | 0 | 1 | 1 | 1 | 1 |
|---|---|---|---|---|---|---|---|
| 0 | 0 | 0 | 1 | 1 | 1 | 1 | 1 |
| 0 | 1 | 1 | 1 | 1 | 1 | 0 | 1 |
| 0 | 1 | 1 | 1 | 1 | 1 | 1 | 1 |
| 1 | 1 | 1 | 1 | 1 | 1 | 1 | 1 |
| 1 | 1 | 1 | 1 | 1 | 0 | 0 | 1 |
| 1 | 0 | 1 | 1 | 1 | 0 | 1 | 1 |
| 1 | 0 | 1 | 1 | 1 | 1 | 1 | 1 |

METHOD AND APPARATUS OF SEARCHING FOR IMAGES

BACKGROUND OF THE INVENTION

1. Field of the Invention

The present invention relates to a method of searching for images.

2. Description of the Prior Art

Techniques have been derived for indexing and searching textual information items, or at least items having some textual content. An example of such a technique is to generate feature data from the textual item (e.g. word distribution) and to allow comparisons between items to be made on the basis of a comparison of the feature data.

With image items, however, few useful techniques have been proposed.

One simple technique is to associate some text with an image. This could be as simple as a title, or could involve more detailed "metadata" such as a paragraph of description, a schedule of items or people in the image, a time of capture of the image, a schedule of those involved in its capture, and so on. Text-based searching techniques can then be used to identify similar images. But of course, providing accurate and useful metadata is time-consuming, expensive and is subjective in respect of the user who generates the metadata.

Other techniques establish feature data based on properties of the images themselves. These might include colour properties, texture properties and the like. But this is also limited because two images, which to a human observer represent the same thing, may have very different image properties. For example, a pair of images of a particular person might have very different image properties because the image backgrounds are different.

It is the aim of the present invention to address these problems.

SUMMARY OF THE INVENTION

In one aspect of the present invention there is provided a method of searching for images comprising the steps of:
  applying a colour resolution reduction process to at least part of a first image such that a total number of colours in the first image is reduced
  forming a plurality of colour planes, each colour plane containing only image portions of the same colour from the first image
  deriving feature data from each of the colour planes corresponding to a property of the image elements
  creating a feature data representation which is representative of the feature data derived from each of the plurality of colour planes,
  undertaking a comparison of the feature data representation derived from the at least part of the first image with feature data representations derived from at least part of a plurality of other images, and
  selecting one of the plurality of other images on the basis of the comparison.

A number of advantages are provided by the present invention. Particularly, the technique embodied in the present invention searches for features found in a first image whilst taking into account all parts of the first image being searched. Thus images returned by the searching method take into account not only the particular features within the first image being searched but also the background or context within which those features are found.

Furthermore the colour resolution reduction and feature data representation processes can be achieved with relatively low amounts of computational activity and can return search results without the requirement for more complex processing. In some embodiments this allows the searching method to be performed in real time.

In some embodiments the feature data representations derived from a plurality of other images is similarly derived to the feature data derived from the first image.

In some embodiments the method according to the present invention includes the step of generating a measure of similarity of the first image with each image of the plurality of other images in accordance with the comparison of the feature data representation from the first image with the feature data representations from the plurality of other images, wherein said selection step is undertaken on the same basis of said similarity measure.

In some embodiments the feature data representation is a histogram.

In some embodiments the first image is a user defined segment of an image larger than the segment.

In some embodiments the first image is one of a plurality of areas comprising a second image, the plurality of areas defined by a grid.

In some embodiments the feature data for each colour plane is derived from a mean value of a group of values, each value in the group corresponding to a count of a number of pixels around a perimeter of each image portion.

Various further aspects and features of the invention are defined in the appended claims.

BRIEF DESCRIPTION OF THE DRAWINGS

Embodiments of the present invention will now be described by way of example only and with reference to the accompanying drawings where like parts are provided with corresponding reference numerals and in which.

DESCRIPTION OF THE PREFERRED EMBODIMENTS

Figure 1A:
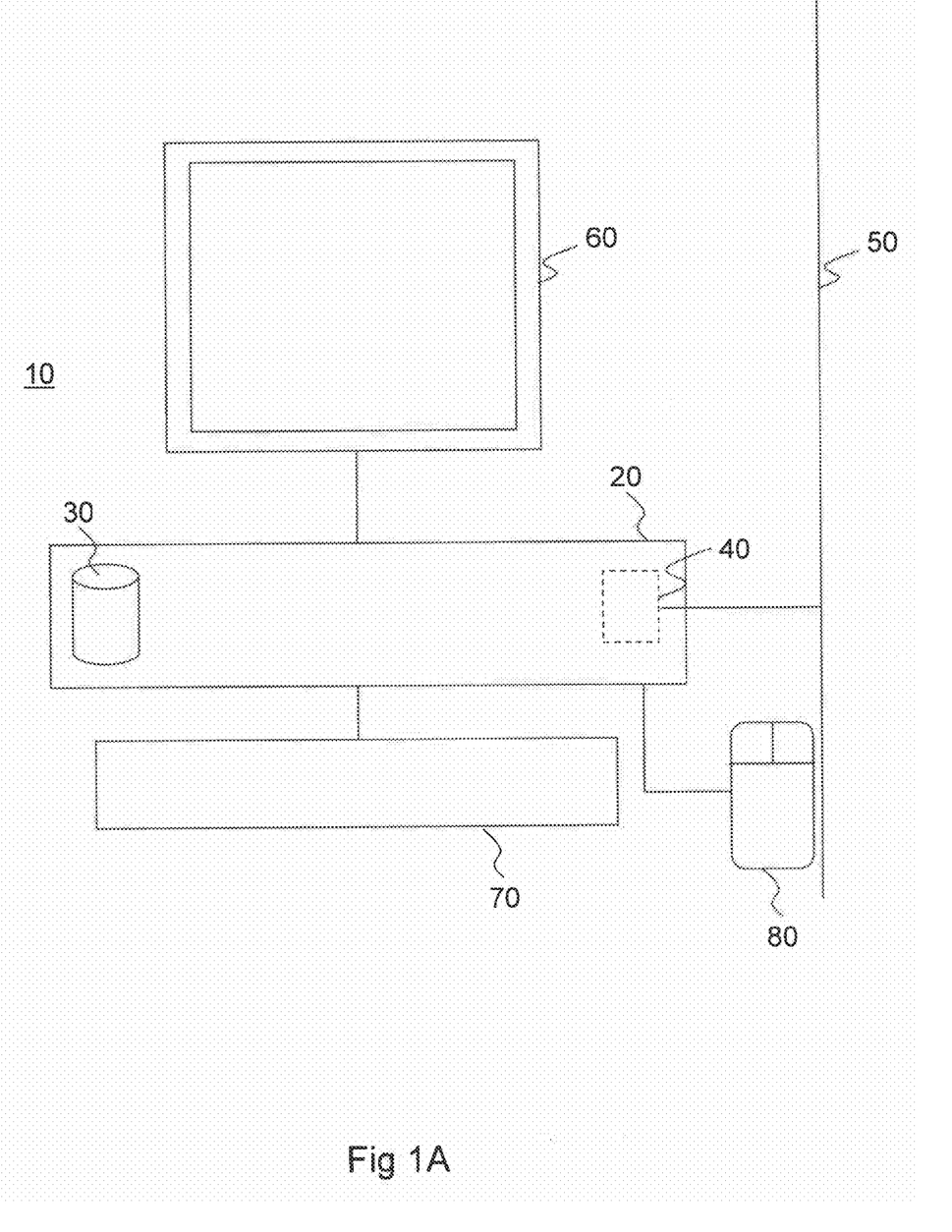
FIG. 1A provides a diagram of a system for implementing and embodiment of the present invention.

FIG. 1A is a schematic diagram of an image processing system based around a general-purpose computer 10 having a processor unit 20 including disk storage 30 for programs and data, a network interface card 40 connected to a network 50 such as an Ethernet network or the Internet, a display device such as a cathode ray tube or liquid crystal display device 60, a keyboard 70 and a user input device such as a mouse 80. The system operates under program control, the programs being stored on the disk storage 30 and provided, for example, by the network 50, a removable disk (not shown) or a pre-installation on the disk storage 30.

In general terms, the image processing system is arranged such that a user may search through a large number of images from an image repository in order to identify images which correspond to various search criteria specified by the user. Typically the user will specify the search criteria by taking a first image and selecting parts or features of this first image. The first image (or the selected part or parts) will, in embodiments, be subject to processing. This processing will be described below. It should be noted here that the processing carried out on the first image may also be carried out on one or more of the images in the repository through which the searching will take place. The processing on the images in the repository may take place before the search is conducted (termed "pre-analysis") or as the search through the images is carried out (termed "on the fly"). This processing will be explained later.

The image processing system will then search the image repository with reference to the parts or features of the first image selected by the user. For example, the user may wish to identify images from the repository including birds. In this case, the user selects a first image that includes a bird and selects the specific parts or features of the image which encapsulate a bird. After the search has been conducted, a list of images from the image repository will be generated. This identifies images in the repository which are deemed to be similar or contain similar elements to the parts or features of the first image selected by the user. This provides the user with the ability to pick out only features of an image that are relevant to them for the particular search. For instance, in this example, the beak of the bird may be selected and only images having similar beaks will be returned in the search. This makes more efficient use of computer resources because only relevant sections are returned to the user. Additionally, by searching only selected parts which are processed in the manner discussed below, the returned images are scale invariant. In other words, in the example above, it will not matter whether the beak is 20% of the image or 70% of the image; both will be returned as relevant. This improves the searching mechanism. In some embodiments the system will rank the images in the generated list by identifying those images which most closely match the selected search criteria.

The image repository may comprise a plurality of images stored within the system for example on the disk storage 30. Alternatively the image repository may be stored on some form of storage media which is remote from the system and which the system gains access to via some form of intermediate link such as the network interface card connected to the network 50. The images may be distributed over a number of storage nodes connected to the network 50.

The images may be in various forms for example "still" images captured by a camera or the images may be taken from a series of images comprising a video stream.

Figure 1B:
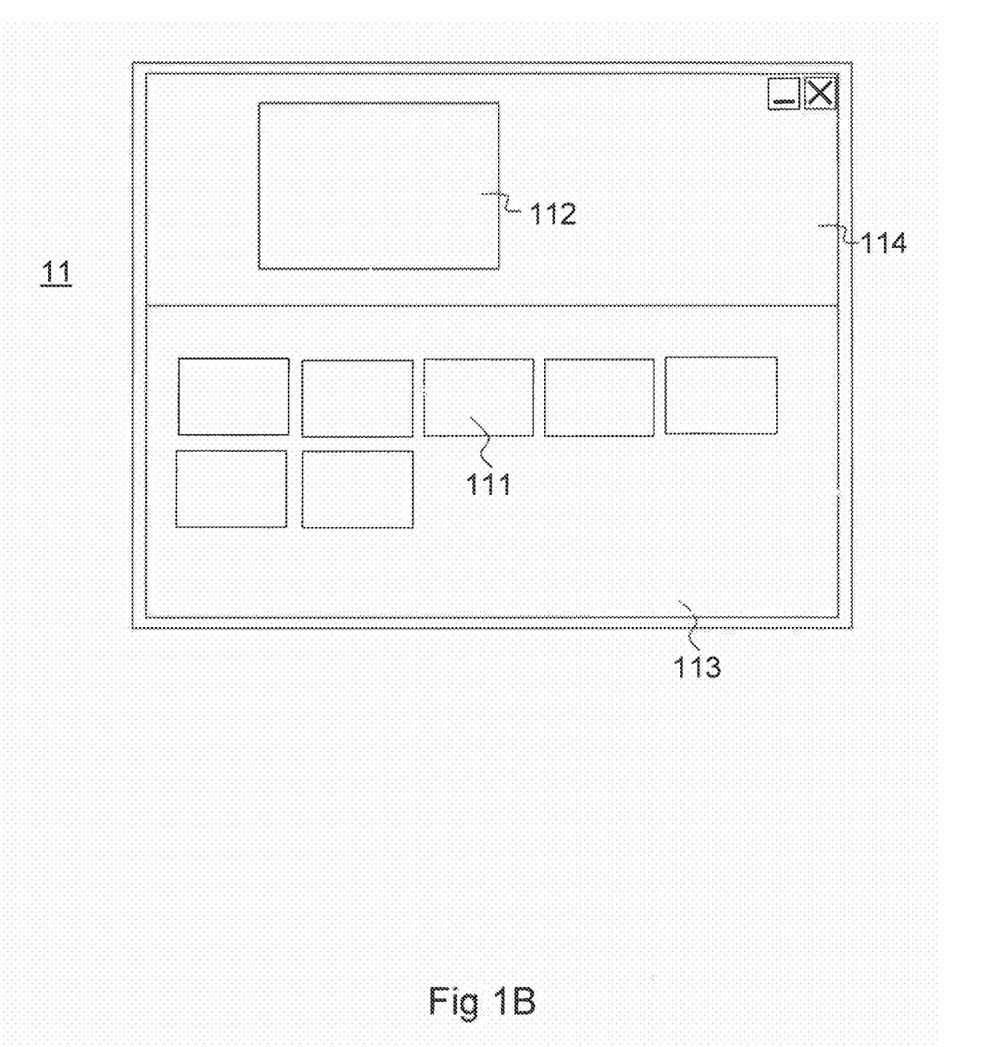
FIG. 1B provides a diagram of a graphical user interface for use in conjunction with an embodiment of the present invention.

FIG. 1B is a schematic diagram showing a graphical user interface 11 for display on the display device 60. The graphical user interface 11 includes a search window 114 and a results window 113. The search window 114 displays the first image 112 from which the search criteria are derived.

As noted above, the first image (or, in embodiments, the selected part) is subjected to image processing.

The Image Searching Mechanism

In order to search the images in the image repository, the image processing system undertakes the following steps:

A first image from which the search criteria are to be derived is selected. The image might be selected from the image repository or be a new image loaded onto the system from an external source via the network 50 or from a disk or other storage media attached to the system.

Figure 2A:
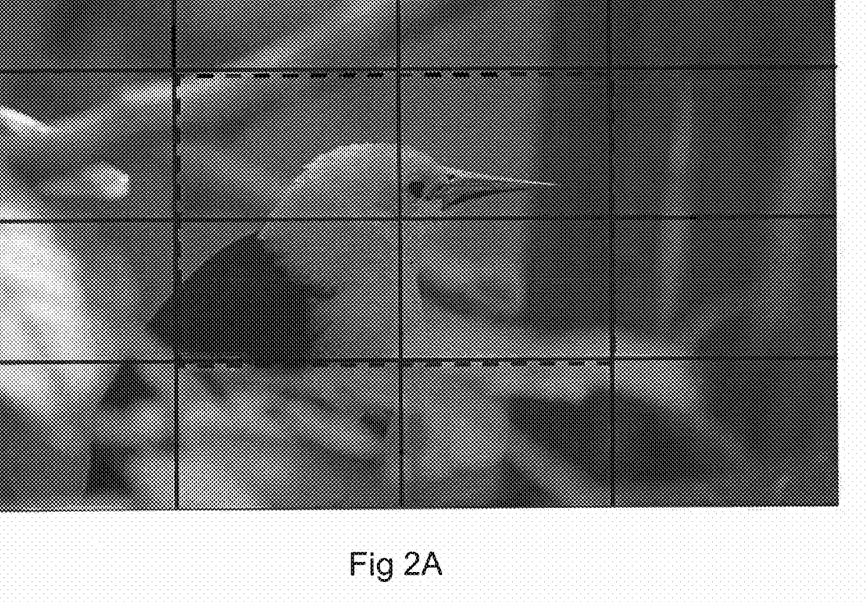
FIG. 2A provides a diagram of a segmented image.

The image is typically presented to the user on the display device 60 and the user selects an area of the image using an input device such as the mouse 80. In some embodiments the image is segmented into a grid and the user selects one or more segments of the grid which contain the features of the image upon which the user bases the search. However, the invention is not so limited and a user can define their own area using the mouse 80 as noted below. FIG. 2A shows an example of an image which has been segmented into a grid and an area of interest highlighted by selecting blocks of the grid which contain a feature of interest from which search criteria area to be derived.

Figure 2B:
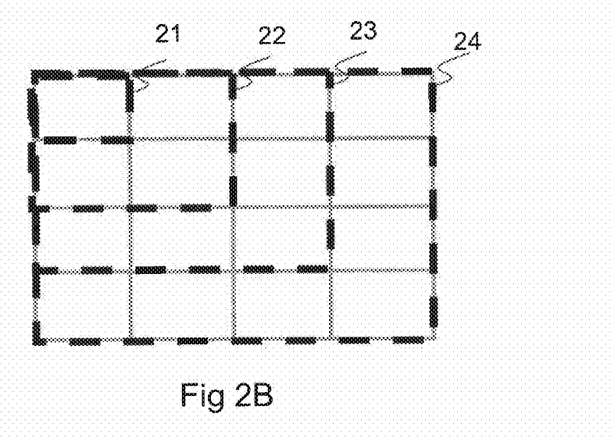
FIG. 2B provides an illustration of possible segmentation areas of an image.

As noted above, in some embodiments at least some of the images from the image repository will be pre-analysed. The pre-analysis of the images in the repository reduces the processing load on the system at the time of searching and thus increases the speed at which the searching through images takes place. To further increase the speed with which the search is conducted, the pre-analysis of the images in the repository is carried out using a similar technique to that used to analyse the first image. Additionally, as part of the pre-analysis of the images in the repository, at least some of the pre-analysed images may be segmented into blocks for example by the application of a grid such as a 2×2 grid, 3×3 grid, 4×4 grid. Alternatively a non-square grid could be used such as a 2×3 or 3×4 grid. Individual blocks or groups of blocks may be analysed independently of the image as a whole therefore allowing not only images from the image repository to be searched but also different parts of each image from the image repository. Furthermore, the system may be operable to search for parts of images which correspond in shape to an area selected by the user, as described above. Thus if a user selects an area as shown in FIG. 2A, areas of corresponding shape will be searched from the images in the image repository. This principle is illustrated in FIG. 2B in which four areas 21, 22, 23, 24 corresponding in shape to the area of interest are highlighted in FIG. 2A. Although FIG. 2B only shows four areas of corresponding shape it will be understood that a 4×4 grid as shown in FIG. 2B in fact comprises more areas of corresponding shape.

Figure 3:
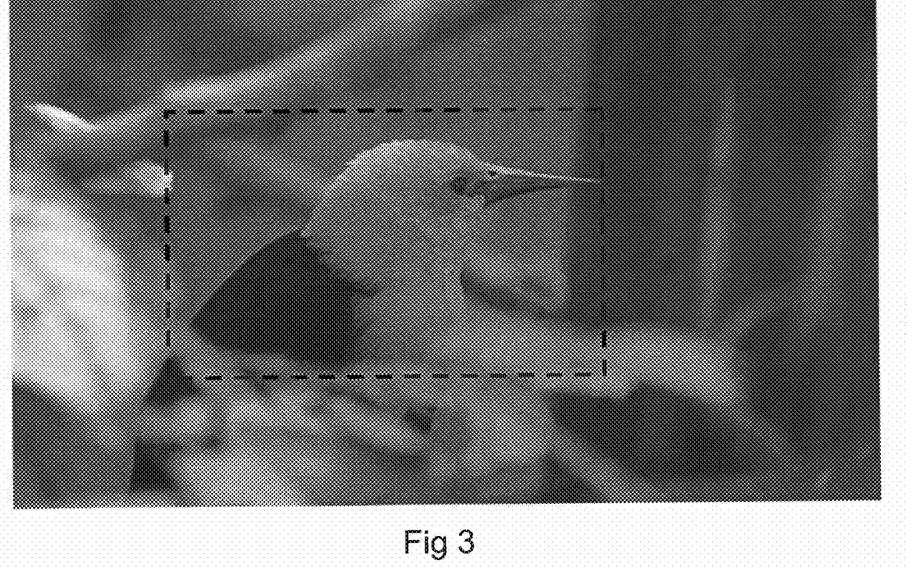
FIG. 3 provides a diagram of a image with an area of interest selected.

In another embodiment as noted above, the user may simply define an area which contains the features of the images upon which the search is to be based. This is indicated in FIG. 3 by the dashed box. The definition of the area of interest will typically be performed using the user input device 80.

In another embodiment of the invention the images from the image repository are divided into a plurality of sets of segments. The plurality of sets of segments which are stored on the image repository are analysed to derive feature data representing an attribute of each of the set of segments. The results of this analysis is then stored in association with the image.

Figure 11:
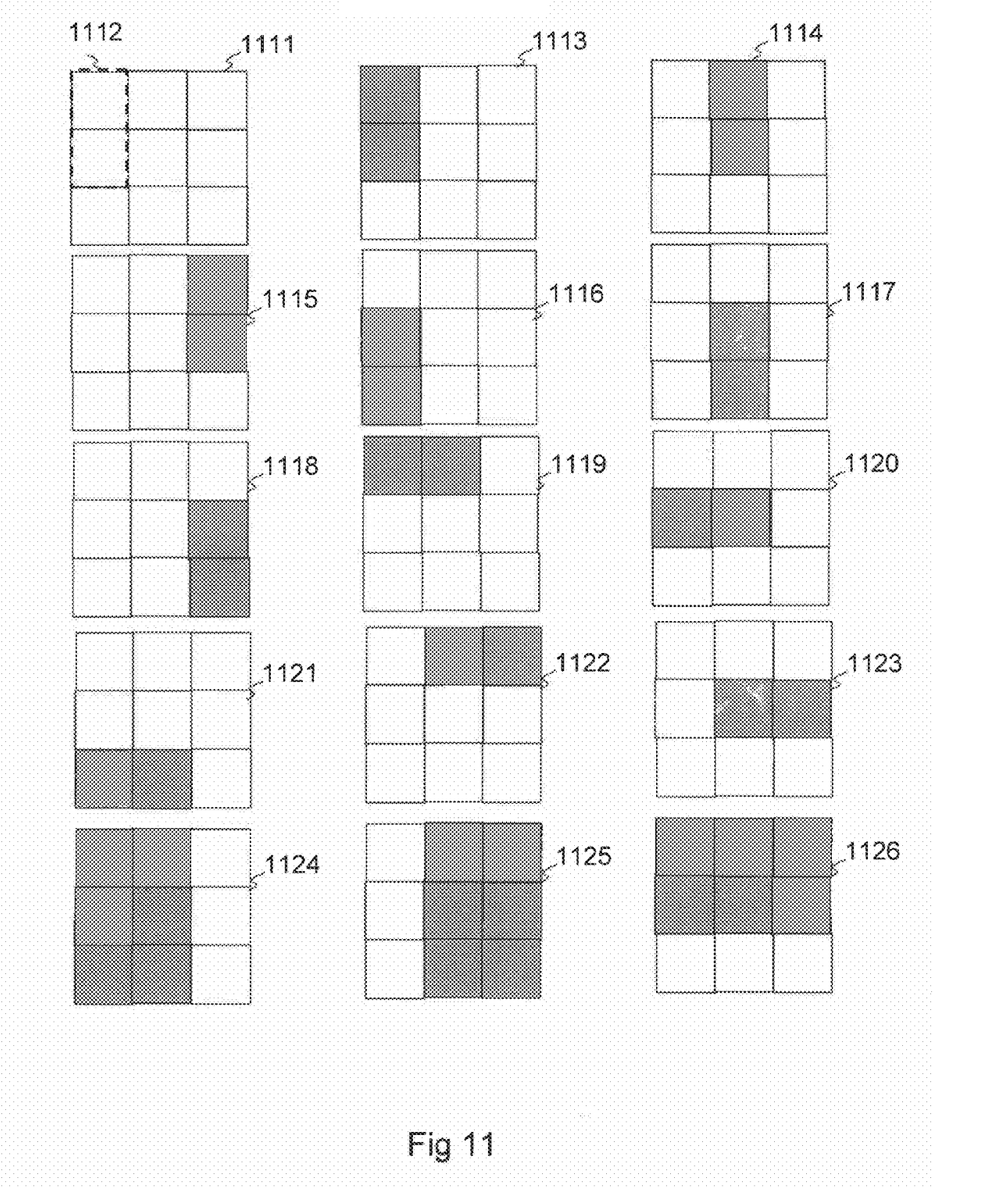
FIG. 11 is a diagram of a plurality of images divided into a set of segments.

The user can then select a set of segments from the first image corresponding for example to a feature of interest. The system is operable to search the sets of segments from the images of the image repository which correspond in some respect to the selected segments. FIG. 11 shows an example of this. FIG. 11 shows a simplified diagram illustrating a first image 1111 divided into a number of segments (the number of segments shown is nine corresponding to a three by three grid but it will be appreciated that this is merely illustrative and in fact the first image may be divided into other numbers of segments such as sixteen for a four by four grid or twenty five for a five by five grid etc.). Further, it will be appreciated that not all possible combinations of segments are shown in FIG. 11. A selected segment set 1112 selected by the user in accordance with the selection methods discussed above is indicated by the dashed line. Once the user has selected the segment set the system is operable to search the stored sets of segments from the images of the image repository which correspond to the selected segments. FIG. 11 shows a plurality of images 1113 to 1126 representing images from the image repository. The plurality of images 1113 to 1126 are divided into segments and sets of segments some of which correspond to the segment set selected by the user. The segment sets searched in the plurality of images 1113 to 1126 are shown by shaded segments. As can be seen in a first group of the plurality of images 1113, 1114, 1115, 1116, 1117, 1118 the set of segments searched corresponds to the shape, size and orientation of the segment set selected by the user. In a second group of the plurality of images 1119, 1120, 1121, 1122, 1123 the set of segments searched corresponds to the shape and size of the segment set selected by the user. In a third group of the plurality of images 1124, 1125, 1126 the set of segments searched corresponds to the shape of the segment set selected by the user.

After the area containing the features of interest has been selected the search through the repository of images continues. In order to perform the search, the first image (or the selected part) needs to be subjected to processing.

Image Processing

In order to commence the search the system, in embodiments, performs a colour resolution reduction procedure on the image. As will be understood, each pixel of an image is typically defined by data representing pixel colour component values such as "R", "G" and "B" values (defining red, green and blue components respectively) or colour encoding schemes providing colour component values such as "Y", "$C_B$" and "$C_R$" (defining a "luma" value and "chroma" values respectively). Such values determine the colour of each pixel. The number of possible colours that can be used to provide pixel colours is determined by the number of bits used to represent the pixel colour component values. Typically this is 16 million colours although this is only exemplary. The colour resolution reduction procedure will typically involve a "down-sampling" or decimation operation on each colour component value the result of which is to reduce the total number of possible colours for a pixel. After the colour resolution reduction procedure has been applied to the image, the number of colours in the image will be reduced. An effect that arises in many images after a colour resolution reduction procedure has been applied is that the image is segmented into areas of the same colour. This effect manifests itself as lending an image a "blocky" appearance. A simplified example of this is shown in FIG. 4.

Figure 4:
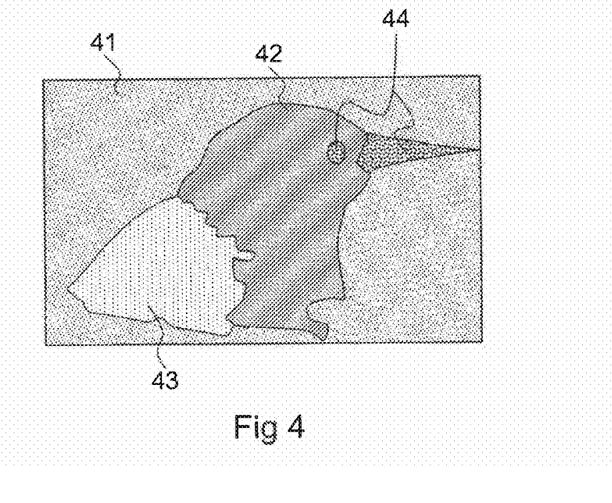
FIG. 4 provides a diagram of an image after undergoing colour resolution reduction.
Figure 5A:
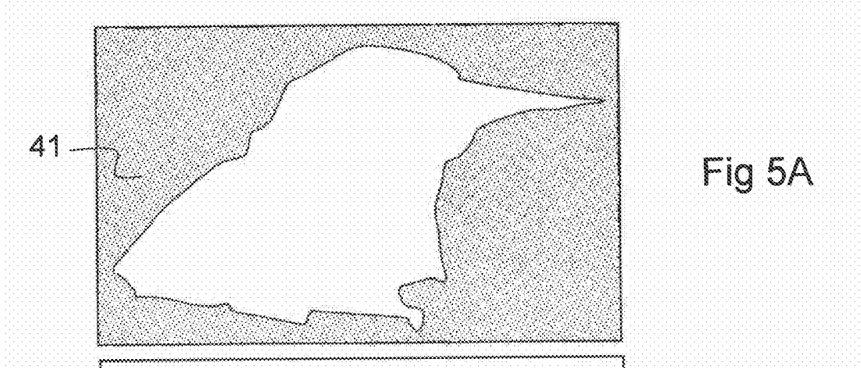
FIG. 5A-5D provides a diagram of separating an image into colour planes.
Figure 5B:
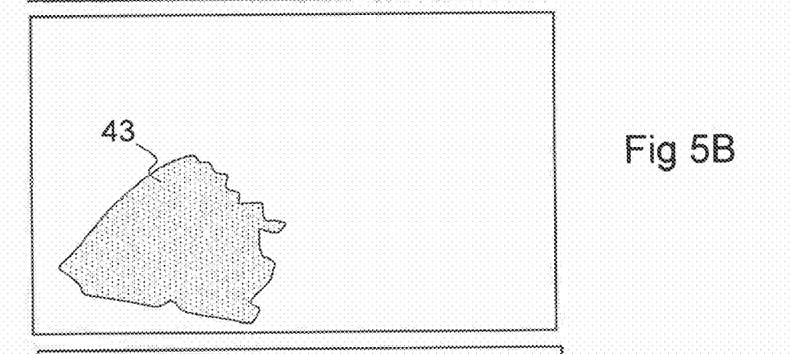
Figure 5C:
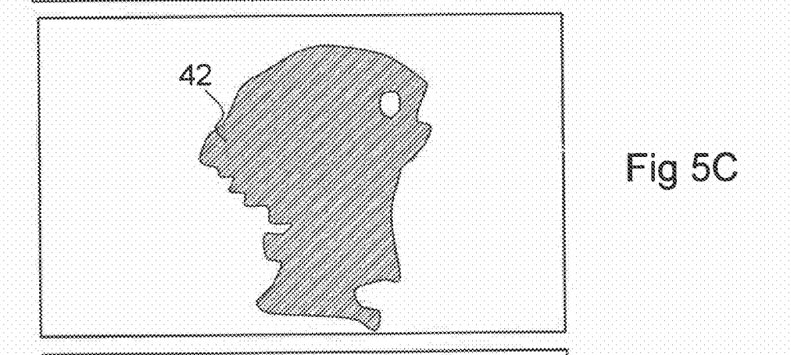
Figure 5D:
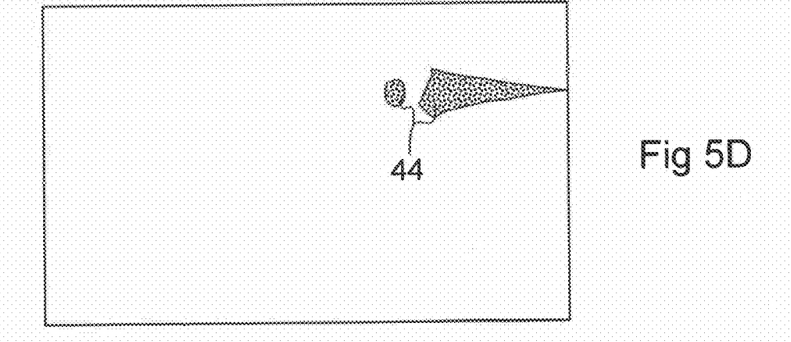

FIG. 4 shows a result of the colour resolution reduction procedure applied to the selected area of the image as shown in FIG. 3 in which the image has been segmented into image elements 41, 42, 43, 44 of the same colour. For the sake of simplicity the number of colours represented has been reduced to four although as will be appreciated the number of colours will be typically be greater than this. In some embodiments the number of colours in an image after it has undergone the colour resolution reduction procedure is 67 although any number less than that of the original image is envisaged.

After the colour resolution reduction procedure has segmented the image into a number of areas of identical colour, the image is further divided into a number of colour planes in which each plane comprises only the image elements of one colour. Thus the number of colour planes will be the same as the total number of colours in the image after the colour resolution reduction procedure. The division of the image into colour planes comprising image elements of each colour is shown in FIGS. 5A to 5D.

Figure 6:
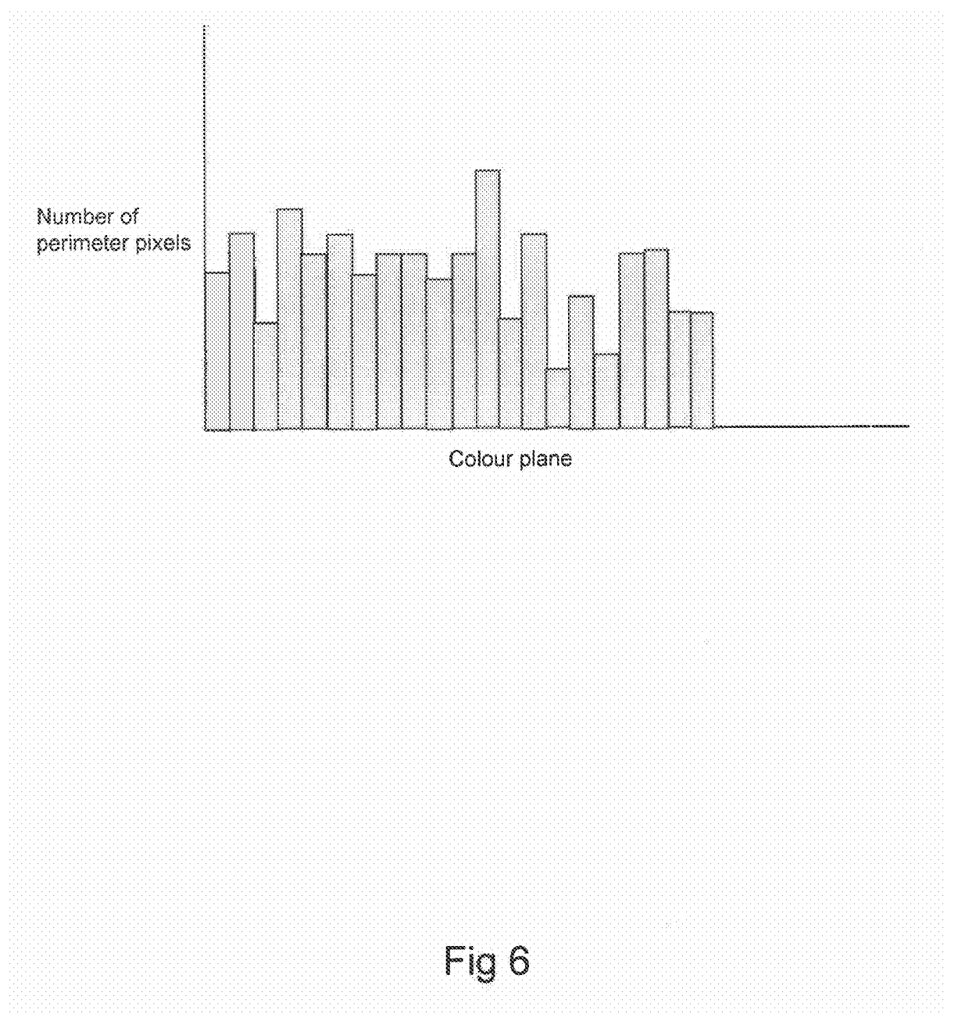
FIG. 6 shows a diagram of a histogram.

Each plane is then analysed in order to derive feature data such as a feature vector corresponding to a property of the image element or elements contained therein. The property may relate to one or many aspects of the image element for example simple size or colour or more complex considerations such as the form of the shape of the elements. Furthermore, as will be understood, a feature vector is one example of an abstract measure of a property of the image element. Another example might be the sum of the absolute differences. In some embodiments the feature vector for one or more colour plane is generated by first detecting the edge pixels for each image element and then counting the pixels around the perimeter of each image element in the colour plane. Although detecting the edge pixels is discussed further below, known techniques such as blob analysis may be used. A mean of this perimeter value is then calculated producing a single scalar value for each colour plane. This procedure is repeated for each colour plane. The calculated mean scalar value for each colour plane is taken and a histogram produced. A simplified histogram is shown in FIG. 6.

The histogram is then compared to similarly generated histograms for each of the images from the image repository.

There are many techniques for comparing the histogram derived from the first image with those similarly derived from the repository of images. In a very simple example corresponding bins of the two histograms can be aligned and the absolute difference between the histograms calculated. The result of this subtraction can be represented as a further histogram. The bins from the resulting histogram can be summed to produce a single value. The closer this value to zero, the more similar the histograms. A similar image in the repository is identified when the summed data is below a threshold. Although only a simple technique described for comparing histograms, the skilled person will appreciate that more sophisticated techniques exist.

The result of the histogram comparison will typically generate a number of "hits" corresponding to similar images from the image repository. These similar images can then be presented to the user on the display screen. As will be understood, the number of returned images can be controlled by specifying certain parameters. For example the system may be arranged to return the first 10 images with histograms which most closely correspond to that of the first image. Alternatively the system can be arranged to return all images the histograms of which meet a certain threshold level of similarity with the histogram derived from the first image, as noted above. In order to aid the user, the set of segments in the "hit" image which correspond to the set of segments selected by the user is outlined in the "hit" image.

In some embodiments the total number of pixels on the perimeter of each image element is counted in order to provide a feature vector for each colour plane. Methods known in the art for detecting edge pixels are typically computationally intensive and require pixel by pixel analysis. This often makes real time edge detection for high resolution images quite difficult. In some embodiments of the system, in the image processing method, the following edge detection technique is used. It is understood, that in other embodiments, a different edge detection technique may be used.

Edge Detection

Figure 8:
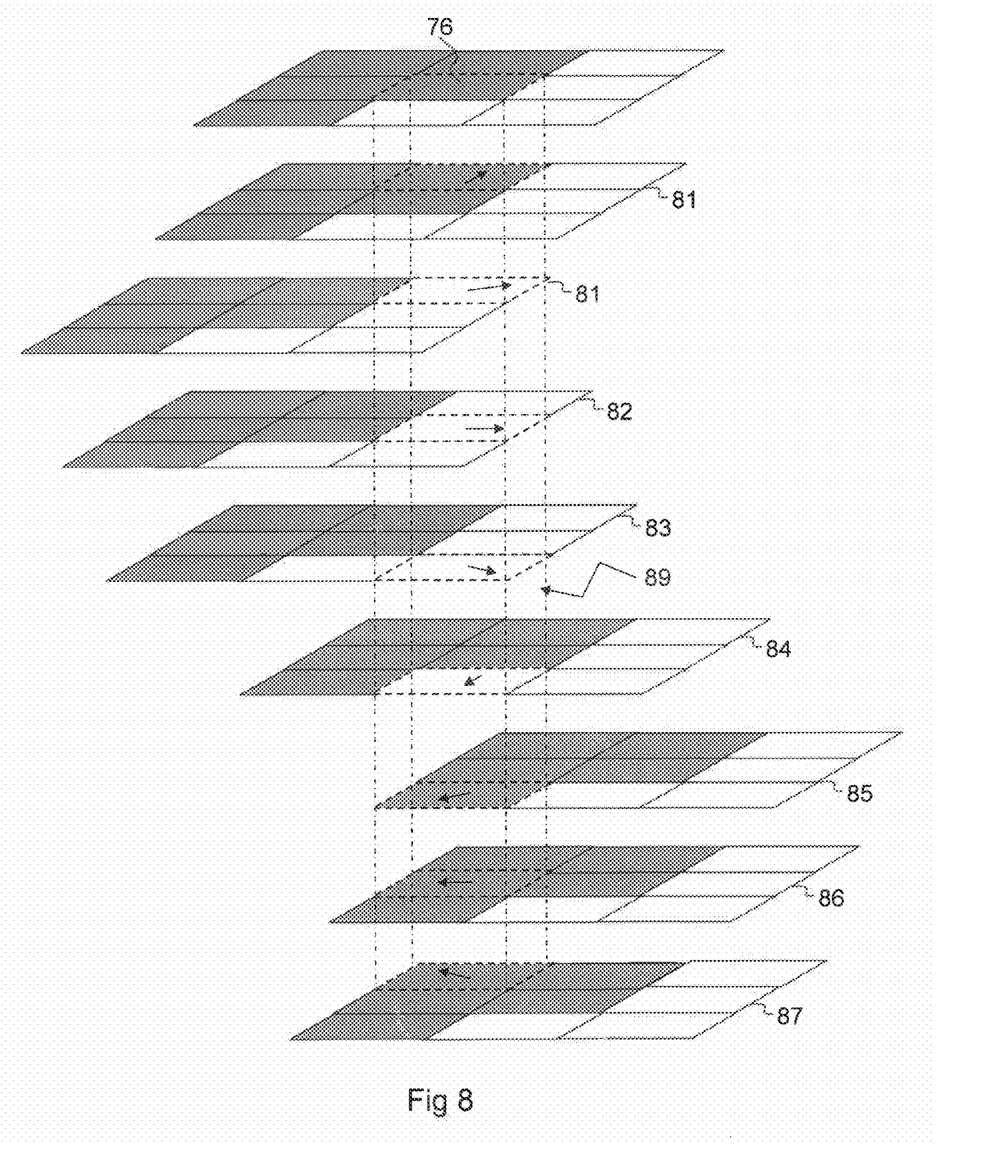
FIG. 8 shows an illustration of the processing of replicated and transformed pixels.
Figure 9:
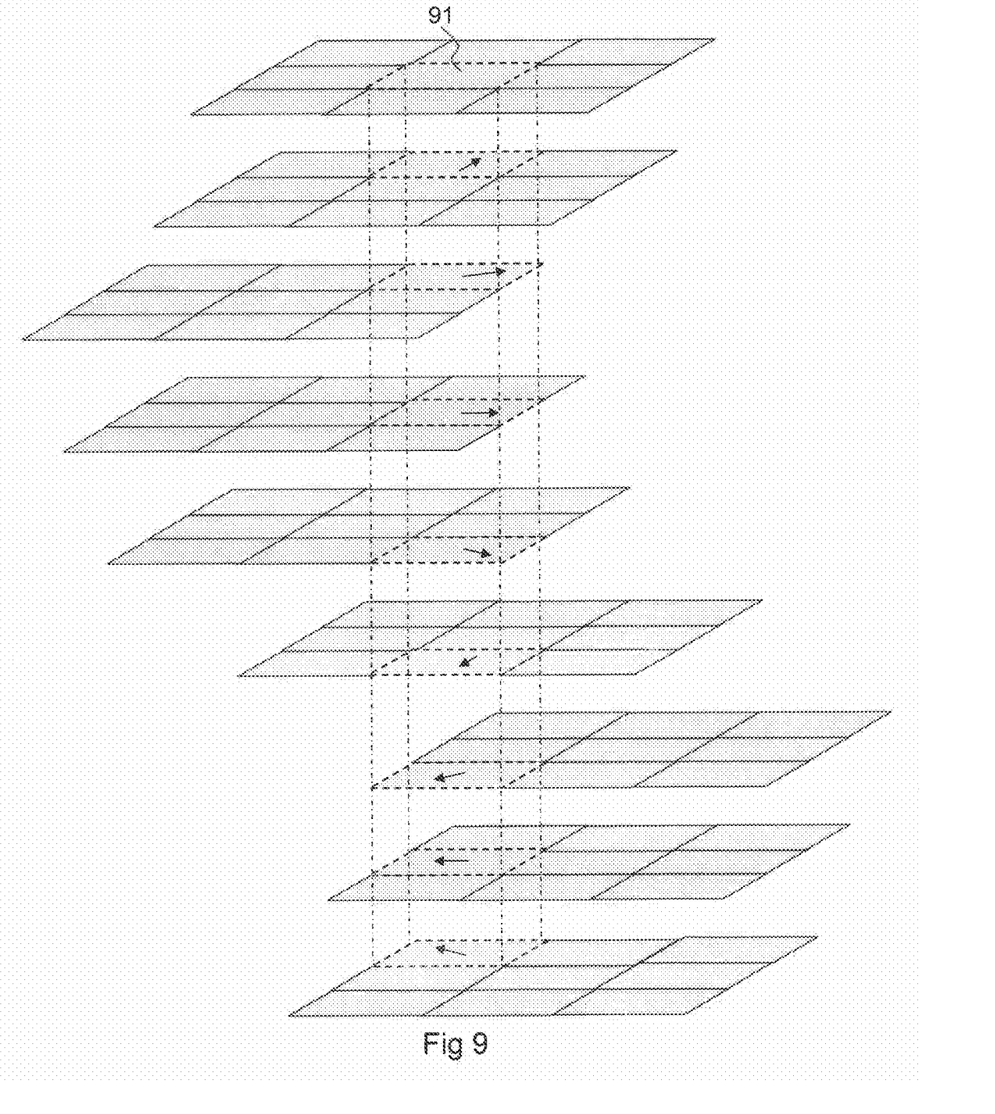
FIG. 9 shows an illustration of the processing of replicated and transformed pixels.

The technique comprises replicating eight times the image to be tested for edge pixels. Each duplication is shifted (i.e. spatially transformed) by one pixel in each of the eight possible directions (i.e. x+1, y+0; x−1, y+0; x+0, y+1; x+0, y−1; x+1, y+1; x+1, y−1; x−1, y−1; x−1, y+1). An XOR function is then taken of all of the corresponding pixels from the eight transformed replicated images. The result of this XOR function is a binary matrix with a "1" indicating an edge pixel and a "0" indicating a non-edge pixel. A simplified version of this technique is illustrated in FIGS. 7, 8 and 9.

Figure 7:
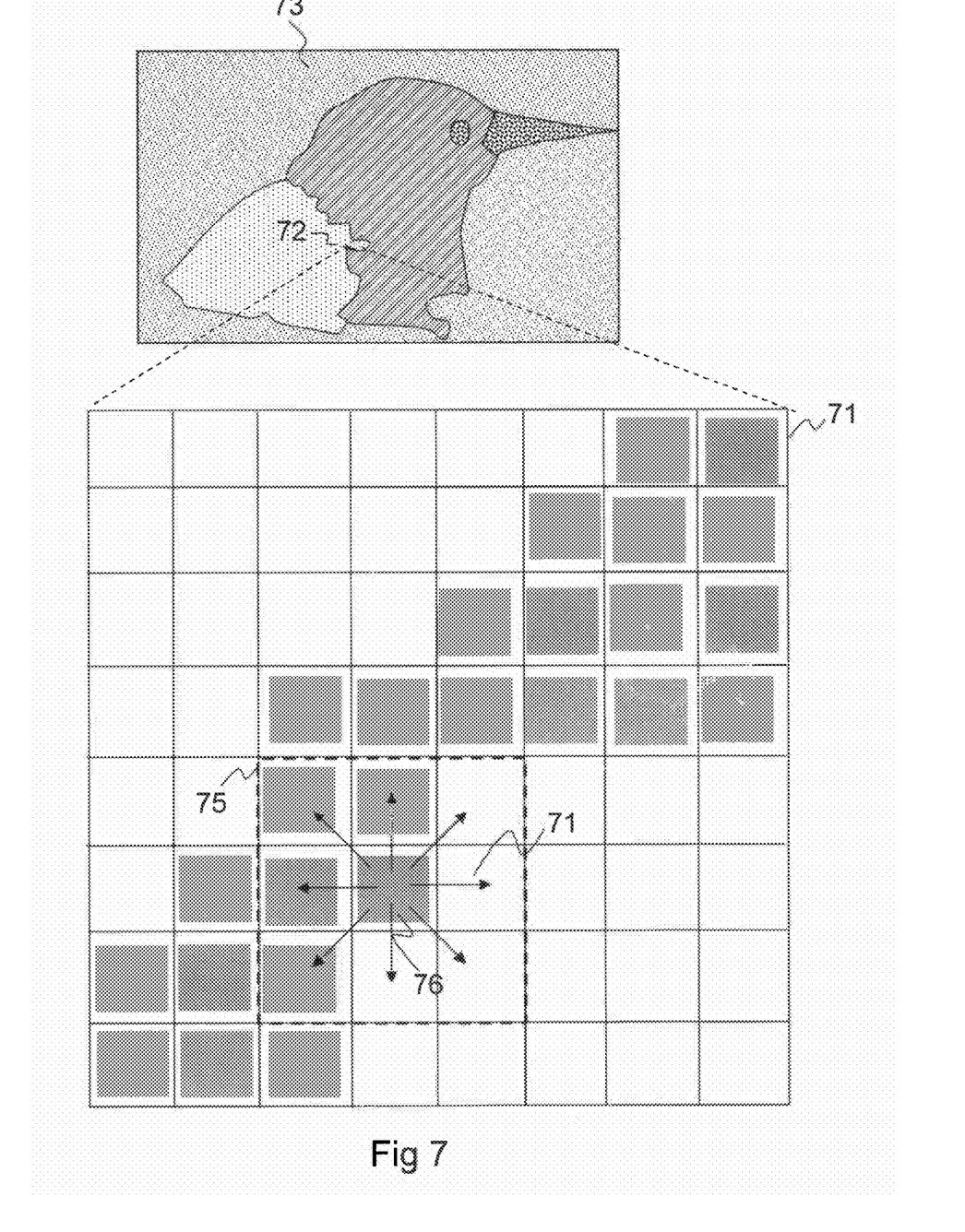
FIG. 7 shows a diagram of an expanded area of an image to be tested for edge pixels.

FIG. 7 shows a simplified expanded area 71 corresponding to a point 72 on an image 73. The simplified expanded area 71 is used to illustrate the technique operating on a small area of the image 73. As will be understood the following is merely illustrative and in practice the technique may be applied to all parts of the image 73. As described above, in accordance with the technique the system is arranged to replicate the entire image 73 eight times such that each duplication is shifted by one pixel in each possible direction (i.e. up, up and right, right, down and right, down, down and left, left, up and left). The relative movement in relation to one pixel is shown by arrows 76 on the simplified expanded area 71. Once the transformed duplications have been created, an XOR function is applied to the colour data for corresponding pixels from each replicated image and from the pixel being tested. This is illustrated in FIGS. 8 and 9. In order to further simplify the illustration, FIG. 8 shows only a section of the area 71 indicated in FIG. 7 by a hashed area 75. As can be seen, the centre pixel 76 of the hashed area 75 is an edge pixel. As shown in FIG. 8, this area is replicated 8 times and each duplication 81, 82, 83, 84, 85, 86, 87, 88 is shifted by one pixel in each possible direction. An XOR function is applied to the colour data of the pixel 76 being tested and for each corresponding pixel (indicated in FIG. 8 by the hashed boxes 89) from the replicated and transformed images 81, 82, 83, 84, 85, 86, 87, 88. As there are only two colours present in the illustration shown in the enlarged section of FIG. 7, then the colour data can be considered to be either a "1" or a "0". This is consistent with using the edge detection technique in the searching of the image repository embodiment. However, as will be appreciated this particular technique is not so limited and there may be more colours than two. With reference to FIG. 8, the XOR function resulting for the pixel 76 being tested is:

1 XOR 1 XOR 0 XOR 0 XOR 0 XOR 1 XOR 1=1

Thus the pixel 76 being tested is shown to be an edge pixel.

FIG. 9 shows an example of a non edge pixel, i.e. one in which the centre pixel 91 is surrounded by pixels of the same colour. With reference to FIG. 9, the XOR function resulting for the pixel 91 being tested is:

1 XOR 1 XOR 1 XOR 1 XOR 1 XOR 1 XOR 1=0

Thus the pixel 91 being tested is shown to be a non-edge pixel.

Figure 10:
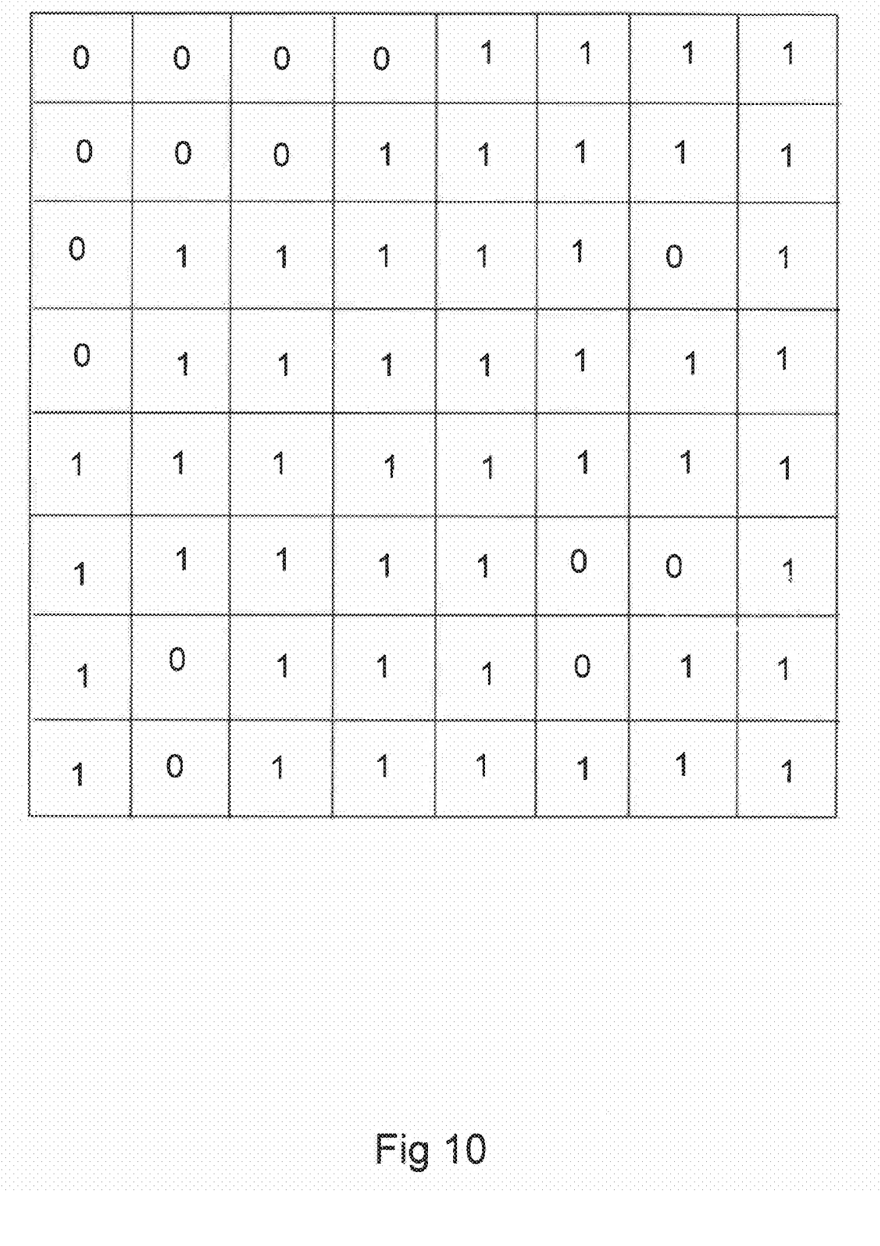
FIG. 10 is a diagram of a matrix indicating edge pixels.

As described above, once the XOR function has been carried out for every pixel in the area 71, a binary matrix with a "1" indicating an edge pixel and a "0" indicating a non-edge pixel is produced. This is shown in FIG. 10. As will be understood, the data from the pixels need not be operated on only with an XOR logical function but may be operated on with a combination of other logical functions such as a combination of NAND functions, OR functions or any combination of logical functions. This particular technique for detecting an edge pixel is advantageous because shifting an image by one pixel is computationally inexpensive. Further, applying logical functions to the shifted image is also computationally inexpensive compared with the prior art. Therefore this technique of edge detection allows real time edge detection. Further, when the searching technique is used with the edge detection technique described in FIGS. 7, 8 and 9, substantially real time searching of video images stored in the repository can be achieved.

As noted earlier, although the foregoing processing has been described in respect of the first image (or the selected part thereof), it is understood that in embodiments, the same or similar processing may be carried out on one or more of the images stored in the repository. This may form "pre-analysed" images or may be performed "on the fly".

Other embodiments may be used in image restoration, for example to detect scratches in a digital representation of image material originally on film stock which has been scanned into digital formats. Other applications of the embodiments of the invention relate to general video processing. For instance, an object may be isolated from the image, processed and then replicated into the image. Processing might be for example colour correction or indeed other special effects. Another application may be to mark or tag an object within an image with a target hyper-link accurately. Systems for manually tagging faces in photographs often allow the user to define a face using a rectangle which may often overlap another face causing confusion from a user clicking on a hyper-link. Embodiments of the present invention may assist in more accurately defining a region to which the hyper-link may be assigned.

Although the foregoing processing describes the colour resolution reduction procedure as taking place on the whole image, it is envisaged that this could instead take place on only the selected part of the image. This would reduce processing load on the system.

Although some embodiments in the foregoing have been described with reference to finding feature data of segments (i.e. the foreground and background components are treated relatively equally), in some embodiments, it is possible to find feature data of a foreground object and feature data of a background in an image or part of an image (for example, a segment). Using this, in embodiments, the feature data of the foreground object will be generated. Additionally, feature data for a part of, or all of, the background in the segment will be generated. The generated feature data of both the foreground object and the background will then be compared with feature data of similar combinations of foreground feature data and background feature data in the stored images. As a result of this comparison, it is possible, in embodiments to generate a relevancy indicator which can be used to generate an ordered list. The most relevant stored images will be seen first by the user, in embodiments. This allows more relevant results to be returned to the user because the foreground object is seen in context. For instance, if the segment under test consists of an image of a beak in a wooded surrounding, a similar beak in a wooded surrounding is more relevant that a similar beak in a desert. Thus, this embodiment returns more relevant images.

In some embodiments the image to be tested may not be replicated and spatially transformed eight times (thus not allowing spatial transform to be applied for every possible one pixel displacement), rather the image may be replicated and spatially transformed fewer than eight times. Although this will give an incomplete analysis as to the presence of edge pixels, the information generated may be sufficient in some applications to provide enough information regarding edge pixels to be useful. As will be understood various modifications can be made to the embodiments described above without departing from the inventive concepts of the present invention. For example, although the present invention has been described with reference to a discrete computer apparatus, the invention could be implemented in a more distributed system operating across a number of connected computers. A server may store the images from the image repository and execute the search whilst a remote computer connected via a network connection to the server may specify the search criteria. This may be achieved by integrating parts of the system, for example the graphical user interface, into a "plug-in" for a web browser.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of searching for images, comprising:
    applying a colour resolution reduction process to at least part of a first image such that a total number of colours in the first image is reduced;
    forming a plurality of colour planes, each colour plane containing only image portions of the same colour from the first image;
    deriving feature data from each of the colour planes corresponding to a property of the image elements;
    creating a feature data representation which is representative of the feature data derived from each of the plurality of colour planes;
    undertaking a comparison of the feature data representation derived from the at least part of the first image with feature data representations derived from at least part of a plurality of other images; and
    selecting one of the plurality of other images on the basis of the comparison.

2. The method according to claim 1, wherein the feature data representations derived from a plurality of other images is similarly derived to the feature data derived from the first image.

3. The method according to claim 1, further comprising
    generating a measure of similarity of the first image with each image of the plurality of other images in accordance with the comparison of the feature data representation from the first image with the feature data representations from the plurality of other images, wherein said selection step is undertaken on the same basis of said similarity measure.

4. The method according to claim 1, wherein the feature data representation is a histogram.

5. The method according to claim 1, wherein
    the first image is a user defined segment of a second image, and
    the second image is larger than the user defined segment.

6. The method according to claim 1, wherein
    the first image is one of a plurality of areas included in a second image, and
    the plurality of areas is defined by a grid.

7. The method according to claim 1, wherein
    the feature data for each colour plane is derived from a mean value of a group of values, and
    each value in the group corresponds to a count of a number of pixels around a perimeter of each image portion.

8. A non-transitory computer readable medium storing computer software including program code, which when executed on a computer, causes the computer to execute the method according to claim 1.

9. The non-transitory computer readable medium according to claim 8, wherein the computer readable medium is a storage medium.

10. An image searching apparatus, comprising:
    a colour averager configured to apply a colour averaging process to a first image such that a total number of colours in the first image is reduced;
    a colour plane former configured to form a plurality of colour planes, each colour plane containing image elements of the same colour from the first image;
    a feature data deriver configured to derive feature data from each of the colour planes corresponding to a property of the image portions;
    a feature data representation creator configured to create a feature data representation which is representative of the feature data derived from each of the plurality of colour planes;
    a comparator configured to undertake a comparison of the feature data representation derived from the first image with similarly derived feature data representations from at least part of a plurality of other images; and
    a selector configured to select one of the plurality of other images on the basis of the comparison.

11. The image searching apparatus according to claim 10, wherein the feature data representation creator is configured such that the feature data representations derived from a plurality of other images are similarly derived to the feature data derived from the first image.

12. The image searching apparatus according to claim 10, further comprising
    a similarity measurer configured to generate a measure of similarity of the first image with each image of the plurality of other images in accordance with the comparison of the feature data representation from the first image with the feature data representations from the plurality of other images, wherein
    said selection is undertaken on the same basis of said similarity measure.

13. The image searching apparatus according to claim 10, wherein the feature data representation is a histogram.

14. The image searching apparatus according to claim 10, further comprising
    a user interface configured, in response to a user input, to define a user defined segment of the first image, wherein the first image is larger than the user defined segment.

15. The image searching apparatus according to claim 10, wherein
    the first image is one of a plurality of areas comprising included in a second image, and
    the plurality of areas is defined by a grid.

16. The image searching apparatus according to claim 10, wherein
    the feature data for each colour plane is derived from a mean value of a group of values, and
    each value in the group corresponds to a count of a number of pixels around a perimeter of each image portion.

* * * * *